United States Patent [19]

Pastor

[11] Patent Number: 4,835,713
[45] Date of Patent: May 30, 1989

[54] POSTAGE METER WITH CODED GRAPHIC INFORMATION IN THE INDICIA

[75] Inventor: Jose Pastor, Westport, Conn.

[73] Assignee: Pitney Bowes Inc., Stamford, Conn.

[21] Appl. No.: 762,990

[22] Filed: Aug. 6, 1985

[51] Int. Cl.⁴ .......................... G06F 15/20; H04L 9/00
[52] U.S. Cl. ................................ 364/519; 364/464.02; 380/51
[58] Field of Search ........... 364/464, 466, 518, 464.02, 364/519; 380/3, 23, 51, 28, 29; 235/432, 101; 371/20, 37

[56] References Cited

U.S. PATENT DOCUMENTS

| | | | |
|---|---|---|---|
| 3,798,360 | 3/1974 | Feistel | 380/29 X |
| 3,818,442 | 6/1974 | Solomon | 371/37 |
| 3,985,998 | 10/1976 | Crafton | 340/825.33 X |
| 4,160,120 | 7/1979 | Bames et al. | 371/37 |
| 4,253,158 | 3/1981 | McFiggans | 364/900 MS File |
| 4,301,507 | 11/1981 | Soderberg et al. | 364/464 |
| 4,322,577 | 3/1982 | Brändström | 380/29 X |
| 4,376,299 | 3/1983 | Rivest | 364/900 MS File |
| 4,447,890 | 5/1984 | Duwel et al. | 364/900 MS File |
| 4,512,020 | 4/1985 | Krol et al. | 371/37 |
| 4,578,774 | 3/1986 | Muller | 364/900 MS File |
| 4,637,051 | 1/1987 | Clark | 235/101 |
| 4,641,346 | 2/1987 | Clark et al. | 380/23 |
| 4,641,347 | 2/1987 | Clark et al. | 380/23 |
| 4,649,266 | 3/1987 | Eckert | 364/464 X |
| 4,660,221 | 4/1987 | Dlugos | 380/23 |

Primary Examiner—Parshotam S. Lall
Assistant Examiner—Edward R. Cosimano
Attorney, Agent, or Firm—Robert H. Whisker; Melvin J. Scolnick; David E. Pitchenik

[57] ABSTRACT

A postage meter is disclosed in which security information is encoded in the printed indicia. The information is encoded in a binary format which is transformed in a predetermined manner such that the information is retrievable by a special reader and decoding algorithm for obtaining the original binary format. The transformed indicia may be in one color or maybe multicolored.

18 Claims, 6 Drawing Sheets

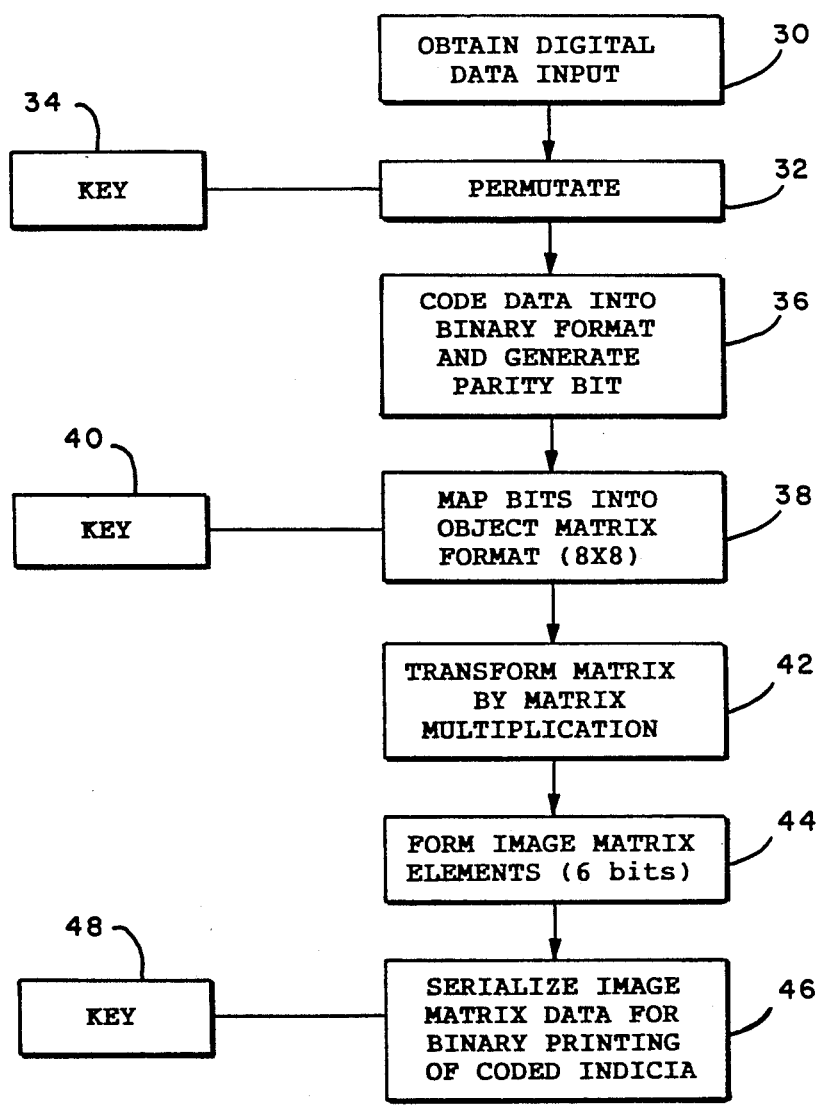

|   | NEXT INSPECTION DATE | | TRANSACTION DATE | | |
|---|------|-----|------|-----|------|
|   | MONTH | DAY | MONTH | DAY | HOUR |
| 1 | NOV. | 18 | SEP. | 25 | 20 |
| 2 | NOV. | 18 | SEP. | 24 | 19 |
| 3 | NOV. | 18 | OCT. | 24 | 19 |
| 4 | NOV. | 17 | OCT. | 24 | 19 |
| 5 | DEC. | 17 | OCT. | 24 | 20 |
| 6 | NOV. | 18 | SEP. | 25 | 19 |
| 7 | JAN. | 02 | JAN. | 01 | 01 |
| 8 | DEC. | 31 | DEC. | 31 | 18 |

FIG. 5
```
0 0 0 0 0 0 0 0 0 0 0 0 0 0 0 0        0 0 0 0 0 0 0 0 0 0 0 0 0 0 0 0
0 0 0 0 0 0 0 0 0 0 0 0 0 0 0 0        0 0 0 0 0 0 0 0 0 0 0 0 0 0 0 0
0 0 1 1 1 1 0 0 1 1 1 1 0 0 0 0        0 0 1 1 1 1 0 0 1 1 1 1 0 0 0 0
0 0 1 0 0 0 1 0 0 1 0 0 0 1 0 0        0 0 1 0 0 0 1 0 0 1 0 0 0 1 0 0
0 0 1 0 0 0 1 0 0 1 0 0 0 1 0 0        0 0 1 0 0 0 1 0 0 1 0 0 0 1 0 0
0 0 1 0 0 0 1 0 0 1 0 0 0 1 0 0        0 0 1 0 0 0 1 0 0 1 0 0 0 1 0 0
0 0 1 0 0 0 1 0 0 1 0 0 0 1 0 0        0 0 1 0 0 0 1 0 0 1 0 0 0 1 0 0
0 0 1 1 1 1 0 0 1 1 1 1 0 0 0 0        0 0 1 1 1 0 0 0 1 1 1 1 0 0 0 0
0 0 1 0 0 0 0 0 0 1 0 0 0 1 0 0        0 0 1 0 0 0 0 0 0 1 0 0 0 1 0 0
0 0 1 0 0 0 0 0 0 1 0 0 0 1 0 0        0 0 1 0 0 0 0 0 0 1 0 0 0 1 0 0
0 0 1 0 0 0 0 0 0 1 0 1 0 1 0 0        0 0 1 0 0 0 0 0 0 1 0 0 0 1 0 0
0 0 1 0 0 0 0 0 0 1 0 0 0 1 0 0        0 0 1 0 0 0 0 0 0 1 0 0 0 1 0 0
0 0 1 0 0 0 0 0 0 1 0 0 0 1 0 0        0 0 1 0 0 0 0 0 0 1 0 0 0 1 0 0
0 0 1 0 0 0 0 0 0 1 0 0 0 1 0 0        0 0 1 0 0 0 0 0 0 1 0 0 0 1 0 0
0 0 1 1 1 0 0 0 1 1 1 1 0 0 0 0        0 0 1 0 0 0 0 0 1 1 1 1 0 0 0 0
0 0 0 0 0 0 0 0 0 0 0 0 0 0 0 0        0 0 0 0 0 0 0 0 0 0 0 0 0 0 0 0
0 0 0 0 0 0 0 0 0 0 0 0 0 0 0 0        0 0 0 0 0 0 0 0 0 0 0 0 0 0 0 0
```
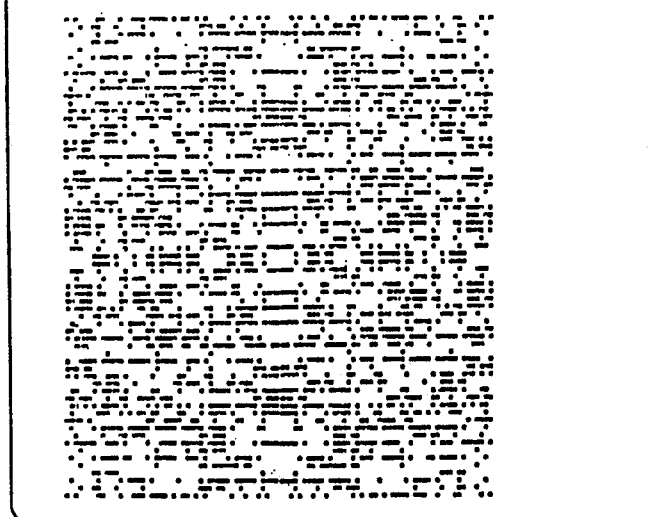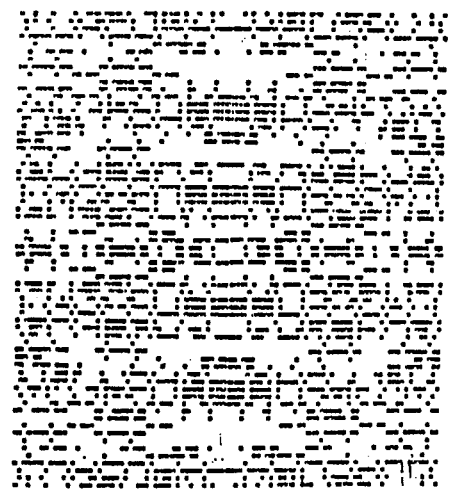

```
P$$J$oo$$oo$Y$$o
$$$$$$$$$$$$$$$$
g$$A$BB$$BB$w$$R
$$$$$$$$$$$$$$$$
B$$B$ww$$ww$w$$w
$$$$$$$$$$$$$$$$
o$$o$oo$$oo$o$$o
$$$$$$$$$$$$$$$$
B$$B$ww$$ww$w$$w
$$$$$$$$$$$$$$$$
o$$o$oo$$oo$o$$o
$$$$$$$$$$$$$$$$
Y$$o$oo$$oo$J$$o
$$$$$$$$$$$$$$$$
w$$R$ww$$ww$B$$g
$$$$$$$$$$$$$$$$
```

POSTAGE METER WITH CODED GRAPHIC INFORMATION IN THE INDICIA

BACKGROUND OF THE INVENTION

The invention relates to electronic postage meters and metering systems and particularly to an improved method and apparatus for ensuring the validity of a postal indicia printed by a postage metering system. The term electronic postage meter or metering system as used herein also refers to other similar meters, such as parcel registers and tax stamp meters that dispense and account for value.

Since the days of the first postage meter, security has been considered the heart of postage meter operation. Security must be absolute since monetary value is being printed.

In prior postage meters, an indicia is printed by a letter press utilizing a uniquely engraved die containing postal information, such that the metered postage indicia is traceable to a particular postage meter. Newer postage meters have been developed that include electronically controlled printers, such as thermal printers, ink jet or dot matrix pin printers for printing the indicia. While these newer meters work well in concept, there is a further consideration of security that must be addressed. Such indicias are rather easily printed by anyone who has a computer operating under a suitable program and an appropriate printer. One way of ensuring the validity of a particular indicia has been to encode a message in the indicia such that an unauthorized person cannot reproduce the appropriate encoding.

Such meters utilizing encoded information are disclosed, for example, in U.S. Pat. No. 4,757,537; issued July 12, 1988 to Arno Muller filed Apr. 7, 1985 and in U.S. Pat. No. 4,725,718; issued Feb. 16, 1988, by R. Sansone entitled Postage and Mailing Information Applying System filed concurrently herewith, both assigned to the Assignee of the instant application.

In a system disclosed in U.S. Pat. No. 4,637,051; issued Jan. 13, 1987 of John Clark, filed July 18, 1983, and assigned to the Assignee of the instant invention there is taught another method and apparatus for producing a coded indicia. In this device, the encoding is such that the indicia is printed in human readable format, but the dots forming the indicia are modified by voids or displacements or the like in order to produce a coded message that is then decodable to ensure that the coded information is identical to the human readable information of the indicia.

SUMMARY OF THE INVENTION

In accordance with the invention, it has been found that with the use of known electronic binary dot matrix printing means, such as ink jet, thermal head, LED printer and the like, one can introduce a greater flexibility into the printed indicia than hitherto considered possible and thereby one can further encrypt for even greater security any desired variables including the postal value, and particularly those variables, e.g., the next inspection date, that would be known only to the meter manufacturer or in a data center, in order to validate the postal transaction. The encrypted variable or variables can be printed in addition to the conventional indicia or substituted therefor.

In accordance with the invention, the information to be printed is first described in a binary format of pixels or dot-positions in a matrix, preferably a square matrix of 2N by 2N configuration, where N is a counting number, referred to herein as the object matrix (OB). The pixels of the object matrix (OB) may incorporate binary coded information in some predetermined order or may constitute one or more alphanumeric or other character or characters in graphic form.

An image transformation is then applied to this matrix, preferably by matrix multiplication by another 2N by 2N matrix "A", such that the transformation is of the form $(IM)=(A)(OB)(A)$ wherein (IM) is the transformed image matrix and is preferably the known HADAMARD matrix. The pixels or dots of the resulting image matrix (IM) are then printed. It will be understood that if further security is desired the binary bits or pixels of the resulting image matrix (IM) may again be scrambled in predetermined manner.

It will be appreciated that the redundancy of information can be increased by printing a number of similar matrices having the same image pattern and in symmetric or non-symmetric format. When the image matrix is printed in first format and then as a reflection of the first format, the probability of losing information is reduced if the printed data is defective because of a printer element failure. It will be understood that while larger matrices are contemplated and will accommodate larger blocks of information, the use of smaller square matrices, e.g. 8 by 8 matrices, is preferable.

Further features and advantages of the method and apparatus in accordance with the invention will become apparent from the descriptions of the drawing.

BRIEF DESCRIPTION OF THE DRAWING

FIG. 2 shows a flow chart for performing a transformation in accordance with the invention.

FIGS. 3A and 3B show a transformation illustrating the creation of a particular image matrix wherein the 0's of the printed array represent the dots of the image array in accordance with the invention.

FIG. 4 is an illustration of various printed matrices showing the transformation of encrypted date information in accordance with the invention.

FIG. 5 is an illustration of the matrix transformation of graphic data.

DETAILED DESCRIPTION OF THE PREFERRED EMBODIMENT

Figure 1:
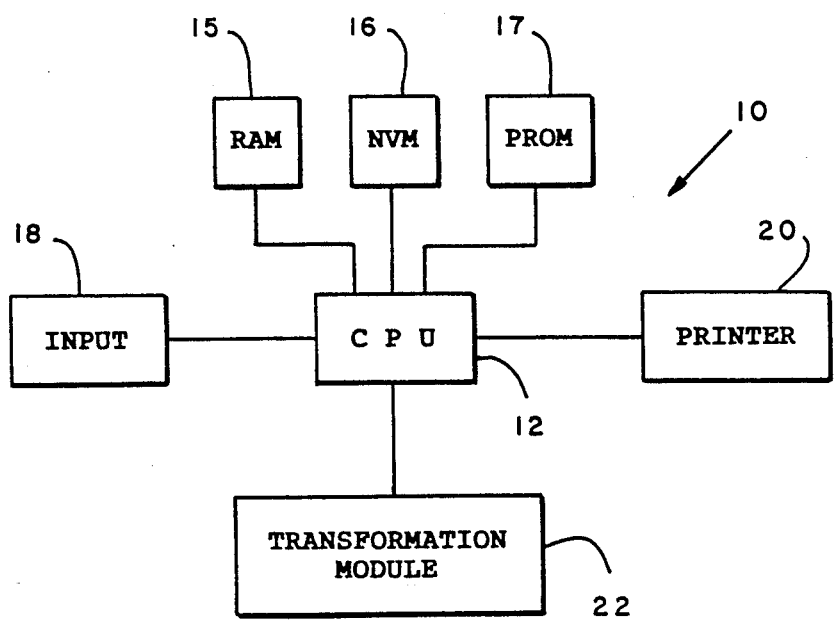
FIG. 1 shows a block diagram of a system that is adapted to print an indicia in accordance with the instant invention.

Referring now to FIG. 1, there is shown at 10 a postage metering system in accordance with present invention. At the heart of this system is the CPU or microprocessor 12 that, operating under the specific instructions from a program residing in PROM 14, controls the basic meter functions, performs calculations based on any input data, and controls the flow of data into the various memories. Typically, a RAM 15 is connected to the CPU for the storage of real time information and for the real time accounting of critical accounting information including the updating of ascending and descending meter registers. The register values are then stored in more permanent form in nonvolatile memory 16 either when the power is interrupted or on a real time basis as is well known in the art.

The system operates in accordance with data, e.g. value to be metered, supplied from an appropriate input means, such as the input keyboard 18 or from a communication device such as described in U.S. Pat. No. 4,301,507 to Soderberg.

The CPU 12 is also coupled to a printer 20 that receives print signals from CPU 12 for the printing of postal information or an envelope, label or the like. The printer for use in accordance with the invention may be a conventional dot-matrix pin printer, or any one of the plurality of like type devices, such as ink jet printers, thermal printers, or LED printers, that are suitable for receiving electronic signals and converting these into dots or pixels printed on a document.

As seen in FIG. 1, in accordance with the invention, CPU 12 is also coupled to a transformation module 22 that operates in accordance with the invention to transform information in an initial object format into an encrypted image format which includes information to ensure the validity of the indicia.

FIG. 2 is a flow chart showing the functions performed in the transformation module 22. It will be understood that the operations may be performed by a microcomputer resident in the transformation module 22 that then communicates in known manner with the CPU 12 or by means of a program stored in PROM 14 accessed in conventional manner by the CPU 12.

Referring to FIG. 2 digital data is received at 30 from the keyboard 18 or graphic and other digital data may be generated by CPU 12 as an array of pixels for providing graphic information, that data, in binary form, would typically be fed to the printer 20 as electronic signals for printing a desired image. In accordance with the invention, the data is fed to the transformation module 22 and is stored in, for instance, a suitable buffer, as a plurality of binary bits representing the alphanumeric or graphic data from which it is derived.

The stored data is then read from the buffer into other registers in a format suitable for forming an 8 by 8 binary matrix, the object matrix (OB). The data may be permutated at 32 in any predetermined manner in accordance with key 34 prior to being read into the matrix format and additionally may be incorporated in the binary matrix at 36 and 38 in any predetermined manner in accordance with specified keys 40. Thus, a given serialized stream of data may be presented as rows or columns of data, forwards or backwards, or as a spiral-like string beginning on the sides or near the center, or as predetermined random distributions within the matrix. These descriptions are presented by way of example only and should not be considered as limiting the invention. For best results the binary matrix array has a parity bit, assigned at 36, so as to make the number of bits always an even or odd number or to identify and/or select the parity for proper processing.

It will be appreciated that an operator or inspector at this point, knowing the keys, will be easily able to retrieve the data from the array of dots in the matrix were it to be printed or displayed. It must be noted that the digital data forming the matrix (OB) may also be the binary representation of an encrypted string of alpha numeric data generated as described, for example, in U.S. Pat. No. 4,757,537 to Muller, that would then require even further decryption to obtain the originally encrypted information.

In accordance with the invention, a matrix transformation is applied to the above defined object matrix at 42 and 44. A suitable and convenient transformation is a matrix multiplication of the form $(IM)=(A)(OB)(A)$ where (A) is a matrix multiplier of the same size as (OB), in this case 8 by 8, wherein the determinant of (A) is not equal to zero, and (IM) is the resultant transformed matrix product.

The elements of the multiplier matrix (A) may conveniently be both positive and negative as well as zero. For best results, there is a further constraint that each of the resulting elements of the image matrix be numbers represented by a maximum of six bits for the 8 by 8 matrix illustrated. With the proper selection of the matrix "A" (i.e. a HADAMARD matrix) all the elements of the image matrix (IM) are positive or negative numbers with the same parity as matrix (OB). Negative numbers in this format may then be represented by their selected matrix (OB) parity complement. Alternatively of course the negative may be represented by a sign bit, the disadvantage being the extra printing element that would be required to produce the dot.

It will be understood that larger matrices will allow the encryption of even larger amounts of data, however, at the expense of the need for much greater data manipulation. A plurality of different 8 by 8 matrices may of course be generated and printed on a document if desired. It will also be appreciated by those skilled in the art that while square matrices having an odd number of rows and columns may be utilized, the recovery of the original object matrix data in such case is considerably harder since the image matrix elements do not necessarily always fall within the aforementioned constraints as to size.

The matrix multiplication detailed above may be accomplished by the microprocessor or CPU 12 operating under a suitable program or alternatively may be conveniently carried out in a matrix multiplier LSI chip manufactured and marketed by INTEL, Santa Clara, Calif., suitably connected to receive the data pixels of the matrix (OB) and to communicate the matrix product (IM) to a buffer in the transformation module 22 or to the RAM 14 for communication to the printer 20.

It will be understood that the bits resulting from the matrix transformation may again be scrambled at 46 in accordance with a predetermined key 48 if desired in order to further enhance the security of the encryption.

Preferably the image matrix is printed at least twice using a two-fold symmetry and for best results is printed four times with a four-fold symmetry, i.e. as a mirror reflection of itself and then another reflection of the two images thus produced. The advantage of providing this redundancy, besides the aesthetic qualities, thus produced, is that the probability of losing information due to any inoperative printing element of the printer 20 may be reduced. It will be appreciated that the image matrix formed as described above may be printed in contiguous or non-contiguous formats, as borders for other printed matter, and as a supplement to or in place of other indicia on a mailpiece or document. If the printer is capable of printing in several colors a predetermined pattern of bits in the object matrix may be transformed and printed as a different plurality of dots in the image colored differently from the remainder of the printed dots. The resulting image pattern of colors might thus be more easily recognized as a valid indicia by a trained inspector simply by visual inspection of the printed matrix.

As mentioned previously the elements of the image matrix are numbers and as such may be represented in ways other than as the binary image matrix described in conjunction with FIG. 2. Thus the image matrix elements may be printed as a matrix array of alphanumeric characters if desired or may be printed serially as a bar code.

FIGS. 3A and 3B show an object matrix (OB) consisting of an array of binary data (shown in FIG. 3A) and a representation of the corresponding image matrix (IM) resulting from a transformation in accordance with the invention. The object matrix (OB) shown in FIG. 3A is multiplied by the known "HADAMARD" matrix to obtain the image matrix shown in FIG. 3B. The 0's shown in the image matrix represent the actuated pixels of the printer. As previously described, the image matrix (IM) in FIG. 3B is printed in four-fold symmetry; the matrix (IM) of the upper right-hand corner being reflected into the left-hand corner and both being reflected into the left-hand corner and both being reflected into the lower half of the array as illustrated in FIG. 3B.

FIG. 4 shows various printed matrices in accordance with the invention in a sequence with the corresponding data encrypted in the matrix being listed below the matrices. As illustrated, the data to be encrypted includes the date of the next inspection, a number that may be kept as a secret by the manufacturer or meter inspector, and the transaction date. The encryption of data relating to the device incorporating the invention herein adds another level of security to that offered by the graphic encoding provided for validating and ensuring the authenticity of the transaction.

FIG. 5 is an illustration of the matrix transformation of graphic data showing two versions of symbolic information which can be used in an indicia image and also showing (in a reduced scale) the corresponding images formed by transformation in accordance with the subject invention, that in this example, is incorporated in a 16 by 16 matrix. The character being encoded are a graphic "P" and "B". It will be appreciated that in comprising the image matrices a very minute change in the pixels forming the object matrix can result in significant changes in the image matrix.

Figures 6, 7:
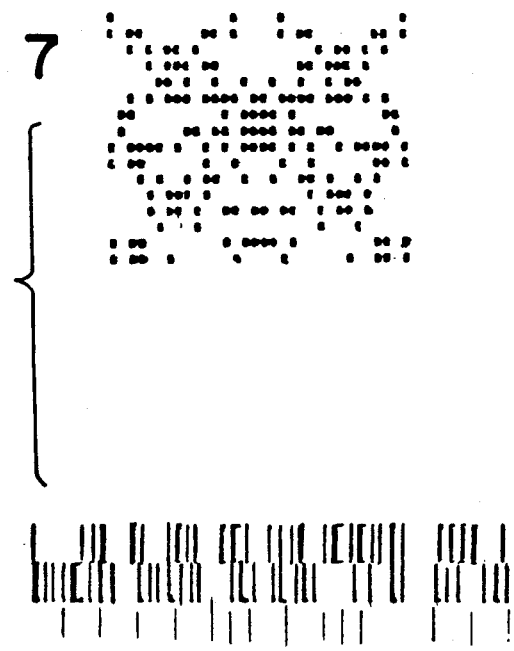
FIG. 6 is an illustration of another indicia wherein the image matrix elements are printed as an alpha numeric array.
FIG. 7 is an illustration of the printing of the transformed image matrix as a serialized bar code.

FIG. 6 is an illustration of an image matrix wherein the elements that have been transformed in accordance with the invention are printed as an array of alphanumeric characters. It will be understood that the characters of the matrix array may be serialized and printed as a data string.

FIG. 7 is an illustration of data generated by a transformation in accordance with the invention and of the same data printed in the form of a serialized bar code.

The information included in the object matrix in any of the illustrated formats is made available to an inspector by performing an inverse transformation algorithm of the dots encrypted in the image matrix.

What is claimed is:

1. A system for providing a postal indicia; said system comprising:
    means for defining a plurality of selected dot-locations in a first array such that, if dots were printed at said dot-locations, said first array would provide postal value validating information in a conventional readable format;
    means for transforming said first array into a second array by using a reversible transformation, said second array having dot-locations different from said dot-locations of said first array;
    means for printing a selectable array of dots on a mail piece in response to print signals from said transforming means;
    means for communicating print signals from said transforming means to said dot printing means, said print signals controlling said dot printing means so that said dot printing means prints transformed postal value validating information on said mailpiece; and
    means for accounting for the postal value represented by said first array when said converted postal value validating information is printed, whereby the accounted for postal value can be validated by recovering said first array by an inverse transformation of said second array.

2. System as claimed in claim 1 wherein said dot-locations of said first array represent binary coded data.

3. System as claimed in claim 1 wherein said postal value validating information includes data known only to the manufacturer of said system.

4. System as claimed in claim 1 wherein said indicia further includes at least one reflection image in addition to said printed converted postal value validating information such that possible errors in subsequently recovering said first array therefrom are reduced.

5. System as claimed in claim 1 wherein a portion of said second array is printed in a color different from that of the remainder of said second array.

6. System as claimed in claim 1 wherein said means for transforming said first array comprises:
    a transformation means operative to encode information for security purposes, said transformation means including matrix multiplication means for transforming in a predetermined manner dot-location signals indicative of information in a first binary matrix into dot-location signals indicative of a secondary binary matrix; and wherein print signals derived from said dot-location signals indicative of said second binary matrix are fed to the dot printer for printing of dots in correspondence therewith such that the information in the first binary matrix is available by a reverse transformation applied to the matrix of dots printed in the second binary matrix.

7. System as claimed in claim 6 wherein said second binary matrix is not in a conventional readable format.

8. System as claimed in claim 6 wherein the first binary matrix is a square matrix of size 2N by 2N where N is an integer.

9. System as claimed in claim 8 wherein the first binary matrix is of size 8 by 8.

10. A method of providing a postal indicia; said method comprising the steps of:
    defining a plurality of selected dot-locations in a first array such that, if dots were printed at said dot-locations, said first array would provide postal value validating information in a conventional readable format;
    transforming said first array into a second array by using a reversible transformation, said second array having dot-locations different from said dot-locations of said first array and comprising converted postal value validating information;
    printing a selectable array of dots corresponding to said second array on a mailpiece; and accounting for the postal value represented by said first array when said converted postal value validating information is printed, whereby the accounted for postal value can be validated by recovering said first array by an inverse transformation of said second array.

11. Method as claimed in claim 10 further comprising the step of: forming said dot-locations of said first array to represent binary coded data.

12. Method as claimed in claim 10 further comprising the step of: including, in said postal value validating information, data known only to the manufacturer of said system.

13. Method as claimed in claim 10 further comprising the step of: including in said postal indicia, at least one reflection image in addition to said printed converted postal value validating information such that possible errors in subsequently recovering said first array therefrom are reduced.

14. Method as claimed in claim 10 further comprising the step of printing a portion of said second array in a color different from that of the remainder of said second tray.

15. Method as claimed in claim 10 wherein the step of transforming said first array comprises the further step of:

encoding information for security purposes, wherein said encoding is carried out by a transformation including matrix multiplication, in a predetermined manner, of dot-location signals indicative of information in a first binary matrix into dot-location signals indicative of a secondary binary matrix, and wherein print signals derived from said dot-location signals indicative of said second binary matrix are fed to a dot printer for printing of dots in correspondence therewith such that the information in said first binary matrix is available by an inverse transformation applied to the matrix of dots printed in the second binary matrix.

16. Method as claimed in claim 15 further comprising the step of: forming said second binary matrix in an unconventional readable format.

17. Method as claimed in claim 15 further comprising the step of: forming said first binary matrix as a square matrix of size 2N by 2N where N is an integer.

18. Method as claimed in claim 17 further comprising the step of: forming said first binary matrix as an 8 by 8 square matrix.

* * * * *